(12) United States Patent
Sheppard

(10) Patent No.: US 6,588,808 B1
(45) Date of Patent: Jul. 8, 2003

(54) LOCOMOTIVE RAIL CONDITIONING SYSTEM ALIGNMENT VERIFICATION

(75) Inventor: David A. Sheppard, St. Paul, MN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/081,298

(22) Filed: Feb. 22, 2002

(51) Int. Cl.⁷ ................................................ B60B 39/00
(52) U.S. Cl. .................................. 291/41; 291/1; 291/46
(58) Field of Search ................................ 291/1, 41, 44, 291/46, 47; 104/17.1, 17.2; 250/222.1, 222.2, 234, 334

(56) References Cited

U.S. PATENT DOCUMENTS

| | | |
|---|---|---|
| 2,797,946 A | 7/1957 | Yongue |
| 3,753,405 A * | 8/1973 | Bryan, Jr. .................. 104/17.1 |
| 3,942,000 A * | 3/1976 | Dieringer ................. 250/222.1 |
| 4,781,121 A | 11/1988 | Kumar et al. |
| 5,426,507 A | 6/1995 | Rando |
| 5,428,538 A | 6/1995 | Ferri |
| 5,487,341 A * | 1/1996 | Newman et al. ............ 104/17.1 |
| 5,621,531 A | 4/1997 | ValAndel et al. |
| 5,675,899 A | 10/1997 | Webb |
| 5,684,578 A | 11/1997 | Nower et al. |
| 5,707,296 A | 1/1998 | Hodgson et al. |
| 5,741,096 A | 4/1998 | Olds |
| 5,872,657 A | 2/1999 | Rando |
| 5,919,295 A | 7/1999 | Lamba et al. |
| 5,936,737 A | 8/1999 | Naumann |
| 6,148,732 A | 11/2000 | Conway et al. |
| 6,151,788 A | 11/2000 | Cox et al. |
| 6,167,630 B1 | 1/2001 | Webb |
| 6,266,143 B1 | 7/2001 | Peterson et al. |
| 6,276,281 B1 | 8/2001 | Mesalic et al. |
| 6,286,219 B1 | 9/2001 | Paulmbo, II |
| 6,308,428 B1 | 10/2001 | Creighton, III |

* cited by examiner

Primary Examiner—Mark T. Le
(74) Attorney, Agent, or Firm—Carl Rowold; David G. Maire; Beusse Brownlee Bowdoin & Wolter, P.A.

(57) ABSTRACT

An apparatus (40,60) for aligning a rail conditioning system, such as a sanding system or a compressed air snow removal system of a locomotive. A source of light (50,70) is removeably and unmovingly attached to a conduit (44,62) of the rail conditioning system to direct a beam of light (53) toward a rail (46) to verify a location of impingement (56) of a spray of rail conditioning material (45,66). The source of light may be a battery operated laser pointer, and it may be attached to a fixture (48,72) that is removeably secured to the conduit. The fixture may be attached over an outlet nozzle (42,62) of the conduit, or it may be threaded onto the conduit in place of the nozzle when the nozzle is removed for cleaning and inspection.

13 Claims, 3 Drawing Sheets

LOCOMOTIVE RAIL CONDITIONING SYSTEM ALIGNMENT VERIFICATION

FIELD OF THE INVENTION

The present invention relates generally to the field of rail transportation, and more specifically to on-board systems for treating the rail directly in front of a locomotive wheel, and in particular, to verifying the proper alignment of a nozzle of a locomotive rail treatment apparatus.

BACKGROUND OF THE INVENTION

Modern locomotives are commonly powered by electric traction motors coupled via suitable gearing to one or more axles of the vehicle. In the motoring mode of operation, the traction motors are supplied with electric current from a controllable source of electric power, such as an engine-driven alternator, to rotate the axle. The axle drives a wheel which, in turn, supports the locomotive on the rail and propels the vehicle along the track. In the braking mode of operation, the electric motor may have its mode changed to function as a generator to assist the mechanical brakes in slowing the speed of the locomotive. In any mode of operation, good adhesion between the wheel and the rail is required for efficient operation of the vehicle. The peak pulling and braking capability of the locomotive may be limited by the adhesion available between the drive wheels and the rails. Contaminants such as snow, water, grease, insects and rust that are present on the rail can reduce the maximum available adhesion.

Systems for treating the rail directly in front of a rail vehicle wheel in order to improve adhesion between the wheel and the rail are well known in the art. The use of compressed air and steam to clean the rail in a railroad system began in the 1,800's. Modern locomotives are often equipped with a sanding system and a rail cleaning system. A cleaning system may include a supply of compressed air selectively delivered to a nozzle having an outlet directly in front of a drive wheel. The nozzle directs a blast of compressed air against the rail at a predetermined angle of attack in order to displace contaminants from the rail. Such cleaning systems are often used to remove accumulations of snow in cold environments. A sanding system may include a supply of sand or other particulate matter selectively delivered to a nozzle having an outlet directly in front of a drive wheel. The nozzle directs a quantity of sand between the rail and the wheel. The sand improves the adhesion between the wheel and the rail, particularly in the presence of snow, ice or grease.

The proper operation of rail treatment systems is important for minimizing the number of adhesion-related stalls that occur on a railway. This is particularly true for railroads in cold climates where snow and ice are a constant challenge. Such systems must be routinely inspected and maintained to ensure that the outlet nozzle of the system is properly aligned with respect to the wheel and the rail so that the material delivered by the nozzle is used effectively. The term "material" as used herein with respect to a rail conditioning system is meant to be inclusive of the sand, steam, compressed air, adhesion product, or other matter that is expelled from a nozzle of a rail conditioning system and directed toward the rail or wheel for accomplishing a desired treatment.

FIG. 1 is an example of a prior art rail conditioning system nozzle alignment verification system 10, in this case applied to a sand application system 11. A locomotive includes a drive wheel 12 and a sand nozzle 14 having an outlet 16 for directing a diffused spray 18 of adhesion-enhancing material toward a rail 20 directly in front of the wheel 12. The diffused spray 18 will have a distribution pattern that is determined by the geometry of the nozzle outlet 16 and that is selected by the system designer to provide a preferred pattern of adhesion-enhancing material on the rail 20. A centerline $C/L_N$ of the nozzle outlet 16 and of the diffused spray 18 may be aligned with a centerline $C/L_W$ of the wheel 12 for proper application of the adhesion-enhancing material. An alignment tool 22 includes a body member 24 designed to fit over the nozzle and an elongated handle 24 attached to the body 24 for manipulation by an inspector. The alignment tool 22 also includes a pointer 28 connected to the body 24 and extending in the direction of the material spray 18. Pointer 28 is designed to have a shape that places its tip 30 along the centerline $C/L_N$ of the diffused spray 18 at a predetermined distance from the nozzle outlet 16. An inspector may determine if the sand nozzle 14 is properly aligned by viewing the location of the tip 30 of the pointer 28 relative to the rail 20. In the event that the nozzle 14 is not properly aligned, the handle 26 also provides leverage for the inspector to apply a force for bending the sand delivery tube 32 to achieve proper alignment of the nozzle outlet 16.

Prior art rail conditioning system nozzle alignment verification system 10 is more effective as an adjustment tool than as an inspection tool. A typical sand delivery tube 32 may be a steel tube having and outside diameter of 1.25 inches and an inside diameter of $15/16$ inch. The tube 32 has such a sturdy construction in order to be able to minimize damage due to impacts with passing objects. In order to bend such a pipe for alignment purposes, it is necessary to apply a considerable amount of force while the material is heated to a red-hot condition. Alignment tool 22 functions as a large pry bar for exerting such force. There is a necessary gap between the inside dimension of the alignment tool body 24 and the outside dimension of the sand nozzle 14 in order for the tool 22 to fit over the nozzle 14. This gap allows the body 24 to wobble relative to the true centerline $C/L_N$ of the nozzle outlet 16, and that movement is exaggerated at the pointer tip 30. Thus, the combination of a bending tool and an alignment mechanism into a single tool 22 results in a poor alignment guide. Alignment of the nozzle 14 may be expected to have an uncertainty of up to ±½ inch where the adhesion material strikes the rail 20 as a result of this movement. Furthermore, the alignment tool 22 is heavy and awkward for the inspector to use, since it must be able to withstand the forces necessary for bending the delivery tube 32 when adjustment is required.

FIG. 1 also illustrates the location of the outlet nozzle 34 of a type of rail cleaning system 35 called a Snow Blaster. A diffused pattern of compressed air 36 is generated by the nozzle 34 which receives the air through a delivery pipe 38. The delivery pipe 38 may typically be a ½ inch schedule 80 steel tube with a ½ inch union welded onto an end to accept the nozzle 34. The delivery pipe 38 is attached to the sand pipe support bracket, which in turn is attached to the truck at the journal box (not shown). The compressed air 36 is directed toward the rail 20 at an angle with respect to the longitudinal axis of the rail 20 and with respect to a vertical axis through the rail 20. The compressed air 36 is used to remove snow and ice from the rail directly in front of the locomotive wheel 12. Current operating procedures require the nozzle 34 to be removed for cleaning and inspection on a periodic basis. The alignment of the nozzle 34 is also visually checked at that time and any gross misalignment corrected. Delivery pipe 38 must be heated to a red-hot condition and bent to change the alignment of the nozzle 34. No process currently exists for accurately determining the alignment of the nozzle 34 with respect to the rail 20.

One may appreciate that the operating environment of the nozzles 14, 34 of a rail conditioning system can be quite harsh. The nozzles 14, 34 are exposed to atmospheric conditions including rain, snow and temperature extremes. They are also subject to impact with foreign objects in the path of the rail 20 and with debris that is dislodged by the moving locomotive, for example rocks, litter and ice. As a result, it is not uncommon for such nozzles to become misaligned. Misalignment of rail conditioning nozzles has been known to contribute directly to adhesion related locomotive stalls, thereby adversely affecting the service level for the railroad. Current methods for checking the alignment of rail conditioning nozzles are at best cumbersome and inaccurate, and they are at worst nonexistent. Because the consequences of a misaligned nozzle can be significant, it is necessary to perform an inspection of such nozzles regularly. A convenient, accurate method for confirming the proper alignment of such nozzles is needed.

Laser alignment systems are well known. U.S. Pat. No. 6,286,219 describes a laser alignment method and apparatus for aligning a series of pipes with respect to each other during the assembly of a fire sprinkler system. A laser light source is affixed to an open end of a pipe, and a mating pipe end is positioned with respect to the laser light beam. U.S. Pat. No. 6,151,788 describes a laser beam used for alignment of a gun sight. A source of laser light is placed inside the gun barrel and the gun sight is adjusted so that the light beam is aligned with a target. U.S. Pat. No. 5,675,899 describes a rotary saw that is guided so that a laser light beam follows a target in order to align the saw blade properly. In spite of the need for improved nozzle alignment systems for a locomotive application, the present inventor is not aware of any application of a laser for improving the delivery of material from a rail conditioning device.

BRIEF SUMMARY OF THE INVENTION

A method and apparatus for aligning a rail conditioning system installed on a rail vehicle for delivery of a rail conditioning material to a desired location on a rail relative to a wheel of the rail vehicle are described herein. Such a rail conditioning system includes a delivery conduit having a nozzle for producing a diffused spray of a material centered along a line of flow directed toward the rail. The method may include: removing a nozzle from a delivery conduit of a rail conditioning system of a rail vehicle; detachably securing a source of light on the delivery conduit in place of the nozzle to unmovingly align the source of light relative to the delivery conduit; energizing the source of light to direct a beam of light along a path corresponding to a central line of a flow of material to be delivered by the nozzle; detecting impingement of the beam of light on one of a rail and a wheel to assess alignment of the nozzle when installed on the delivery conduit for centering the flow of material on a desired location; removing the source of light from the delivery conduit; reinstalling the nozzle onto the delivery conduit; and delivering a spray of a rail conditioning material to provide a desired coverage of the rail by the rail conditioning material. The method may include performing the steps of detachably securing a source of light, energizing the source of light, detecting impingement of the beam of light, and removing the source of light during a service event when the nozzle is otherwise removed from the delivery conduit for servicing. The method may include: removing the nozzle from the delivery conduit by unthreading the nozzle; attaching the source of light to a fixture provided with threads; and threading the fixture onto the conduit in place of the nozzle.

A method of aligning a rail conditioning system installed on a rail vehicle for delivery of a rail conditioning material to a desired location on a rail relative to a wheel of the rail vehicle is described herein. The rail conditioning system may include a delivery conduit having a nozzle for producing a diffused spray of a material centered along a line of flow directed toward the rail, and the method may include: detachably securing a source of light to be unmovingly aligned with a nozzle end of a conduit of a rail conditioning system; energizing the source of light to direct a beam of light along a path corresponding to a central line of flow of a diffused spray of material to be delivered by the conduit through a nozzle; detecting impingement of the beam of light on one of a rail and a wheel to assess alignment of the nozzle for centering the flow of material on a desired region of the rail; and delivering a spray of rail conditioning material to the rail through the nozzle to provide a desired coverage of the rail by the rail conditioning material. The method may include: removing the nozzle from the conduit prior to the step of detachably securing the source of light; detachably securing the source of light in place of the nozzle; and reattaching the nozzle between the steps of detecting impingement and delivering a spray of rail conditioning material. The method may include: attaching the source of light to a fitting having a generally hollow shape adapted for receiving the nozzle; and detachably securing the source of light by placing the fitting over the nozzle. The fitting may be formed to contain a notch in a predetermined location; and the method may include aligning the fitting on the nozzle by engaging a protruding feature of the nozzle into the notch.

A method of aligning a rail conditioning system installed on a rail vehicle for delivery of a rail conditioning material to a desired location on a rail is described herein, the rail conditioning system including a delivery conduit having a nozzle for producing a diffused spray of a material centered along a line of flow directed toward the rail, the method includes: adjusting alignment of a conduit to have approximately a first predetermined angle in a forward direction and to have approximately a second predetermined angle in a sideward direction with respect to a vertical axis passing through a rail; removing an outlet nozzle from the conduit; unmovingly securing a source of light on the conduit in place of the nozzle; energizing the source of light to direct a beam of light along a path corresponding to a central line of a flow of material to be delivered by the nozzle; adjusting alignment of the conduit to direct impingement of the beam of light onto a predetermined location; removing the source of light from the delivery conduit; and reinstalling the nozzle onto the delivery conduit.

An apparatus for aligning a rail conditioning system installed on a rail vehicle for delivery of a rail conditioning material to a desired location on a rail is described herein, the rail conditioning system including a delivery conduit having a nozzle for producing a diffused spray of a material centered along a line of flow directed toward the rail, the apparatus including: a fitting for removable attachment to a conduit of a rail conditioning system; and a source of light attached to the fitting for directing a beam of light in unmoving alignment with a central line of a flow of material to be delivered through the conduit.

The fitting may further include a generally hollow shape adapted for fitting over portion of a nozzle attached to the conduit. The fitting may include a notch formed in the fitting for engagement with a protruding member of the nozzle for alignment of the source of light along the line of flow. When a nozzle is threaded into the conduit, and the fitting may include threads adapted to thread into the conduit in place of the nozzle. The source of light may include a battery-operated laser.

BRIEF DESCRIPTION OF THE DRAWING

The features and advantages of the present invention will become apparent from the following detailed description of the invention when read with the accompanying drawings. Certain common elements illustrated in more than one of the drawings may be numbered consistently among the drawings.

DETAILED DESCRIPTION OF THE INVENTION

Figure 2:
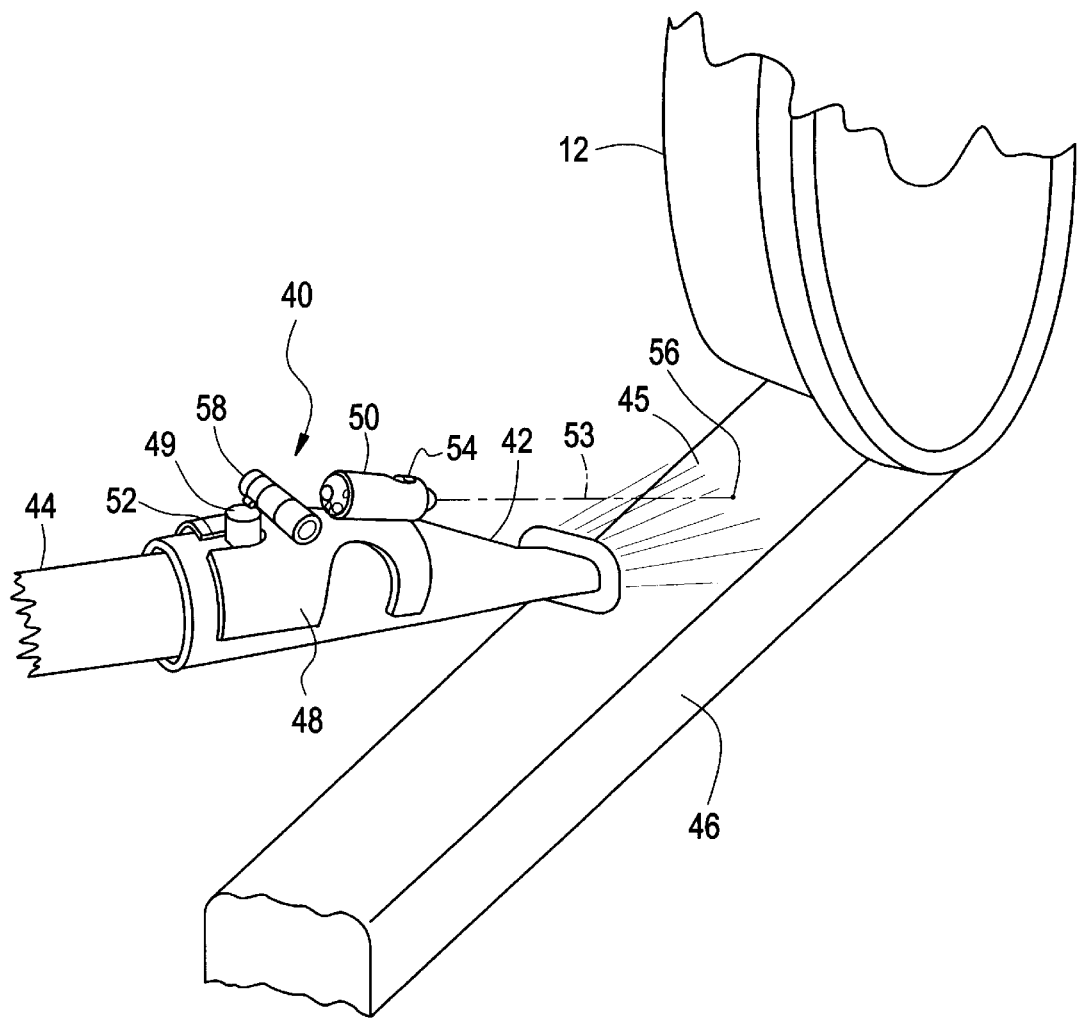
FIG. 2 is a perspective view of one embodiment of an apparatus for aligning a rail conditioning system of a rail vehicle.

FIG. 2 illustrates an embodiment of an apparatus 40 for aligning a rail conditioning system of a rail vehicle, in particular, for aligning the orientation of a nozzle 42 connected at an outlet end of a conduit 44 used to deliver a rail conditioning material 45 to a rail 46. The apparatus 40 includes a fitting 48 adapted to be detachably connected proximate the nozzle end of the conduit 44. The fitting 48 is illustrated as being attached directly to nozzle 42 and indirectly to conduit 44, although in other embodiments it may be attached directly to either one or both of these components. In this embodiment, the fitting 48 may be formed from a section of polyvinylchloride (PVC) tubing having a generally hollow shape and trimmed to fit around the outside of the nozzle 42. Other materials of construction having a desired level of strength and resistance to impact damage and corrosion may be used, such as aluminum, stainless steel, etc. The fitting 48 may be spring-fit to retain a position on the nozzle 42, or it may be attached with a strap, clamp or other type of releasable connector that provides a rigid, unmoving connection there between. The rigid connection eliminates uncertainty in the alignment of nozzle 42 associated with the prior art technique. For applications where the conduit 44 or nozzle 42 includes a protruding member 49, the fitting 48 may be formed to include a notch such as cut-out region 52 is located to engage the protruding member 49 to prevent the fitting 48 from rotating with respect to a longitudinal axis of the nozzle.

The apparatus 40 also include a source of light 50 attached to the fitting 48. The source of light 50 may be attached to the fitting 48 by any known means, such as an adhesive, clamp, strap, mechanical fastener, or combination thereof, so that there can be essentially no movement there between. The source of light 50 is attached to the fitting 48 in a position to direct a beam of light 53 toward the rail 46 along a central line of flow of a spray of material to be expelled from the nozzle 42. The source of light 50 may be, for example, a miniature flashlight for producing a beam pattern corresponding to the diffused spray of rail conditioning material 45 produced by nozzle 42, or preferably a battery operated laser pointer device for producing a coherent beam of light 53. Depending upon the geometry of the particular embodiment, the beam of light 53 may be collinear with or may be parallel to the central line of the flow of rail conditioning material 45. Because the fitting 48 is attached snugly to the nozzle 42, and the source of light 50 is attached snugly to the fitting 48, the beam of light 53 is held in close alignment with a centerline C/L of the spray of rail conditioning material 45. Be securing the source of light 50 to the conduit 44 and/or nozzle 42, it can be held in position to be in unmoving alignment with the direction of the spray of rail conditioning material 45.

Figure 1:
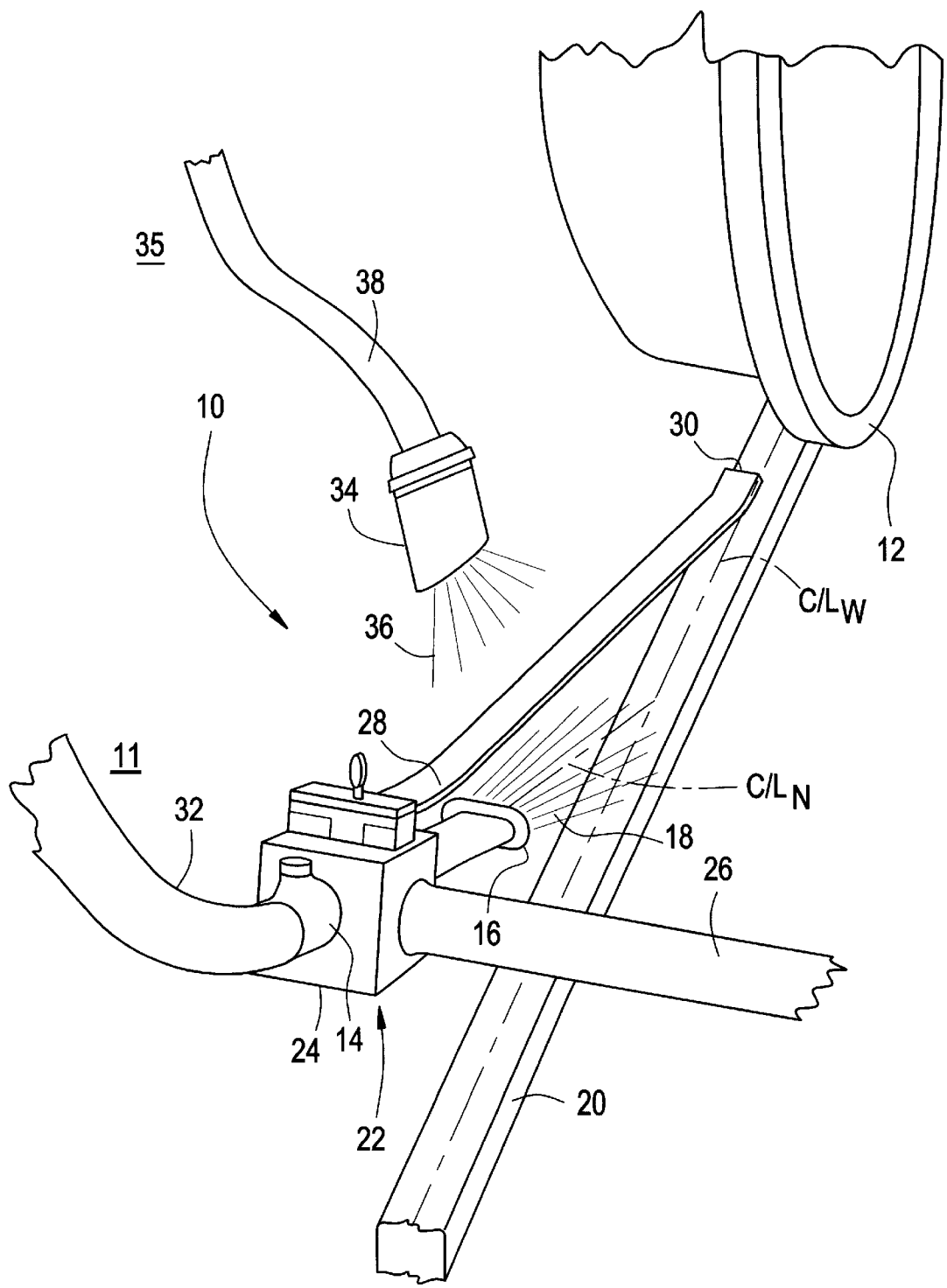
FIG. 1 is a perspective view of a prior art rail conditioning system nozzle alignment verification system.

The service regiment for a locomotive may include the verification of the proper alignment of the outlet nozzle 42 for delivery of a rail conditioning material 45 such as sand to a desired location on a rail 46, i.e. to a desired location relative to a wheel. Apparatus 40 is detachably secured proximate the nozzle end 42 of conduit 44. The source of light 50 is energized, such as by toggling switch 54, to direct a beam of light 53 along a path corresponding to a central line of flow of a diffused spray of material 45 to be delivered by the conduit 44 through the nozzle 42. By detecting the location of impingement 56 of the beam of light 53 upon the rail 46 or upon the wheel 12, it is possible to assess the alignment of nozzle 42 for centering the flow of material 45 on a desired region of the rail 46. Once the nozzle 42 is properly aligned, the spray of material 45 may be delivered to the rail 46 to provide a desired coverage of the rail 46 by the rail conditioning material 45. If the alignment is shown to be improper, a tool such as prior art alignment tool 22 of FIG. 1, except without the need for pointer 28, can be used to bend conduit 44 to place nozzle 42 into proper alignment. Apparatus 40 may be removed during such a bending process, or preferably it may remain installed on the nozzle 42 as conduit 44 is bent in order to provide real-time feedback regarding the alignment of nozzle 42. It is possible with such an apparatus 40 and method to adjust alignment of conduit 44 and nozzle 42 to direct the impingement of the beam of light 53, i.e. the spray of rail conditioning material 45, to within ±¼ inch of a desired location such as the center of the wheel 12. The unmoving alignment between the beam of light 53 and the nozzle 42 eliminates much of the position uncertainty and alignment error associated with the prior art alignment tool 22 of FIG. 1.

Note that in this embodiment showing a sand delivery nozzle 42, it is possible to confirm the location of impingement 56 with respect to both a longitudinal axis of the rail 46 and along a width of the rail 56. With the specific embodiment of FIG. 2, when the source of light 50 is aligned with the nozzzle 42, the beam of light 53 may be displaced slightly above a centerline of the flow of rail conditioning material 45, thereby displacing the point of impingement 56 somewhat away from a center of the diffused spray of material 45. Generally, such a displacement along the rail longitudinal axis is not significant to the performance of the rail conditioning system, but if desired, such displacement may be accommodated by an appropriate procedural control. Furthermore, nozzle 42 may have a somewhat elliptical outlet end for providing a spray of material 45 that is somewhat wider than it is high. The alignment of such an elliptical shape may be verified by using an alignment apparatus having more than one source of light. Alternatively, the proper horizontal orientation of the elliptical nozzle shape may be visually confirmed by viewing the nozzle against a level 58 to determine if the conduit 44 or nozzle 42 has been twisted. Such confirmation may be done prior to a final confirmation of alignment of the nozzle 42 with the apparatus 40.

Figure 3:
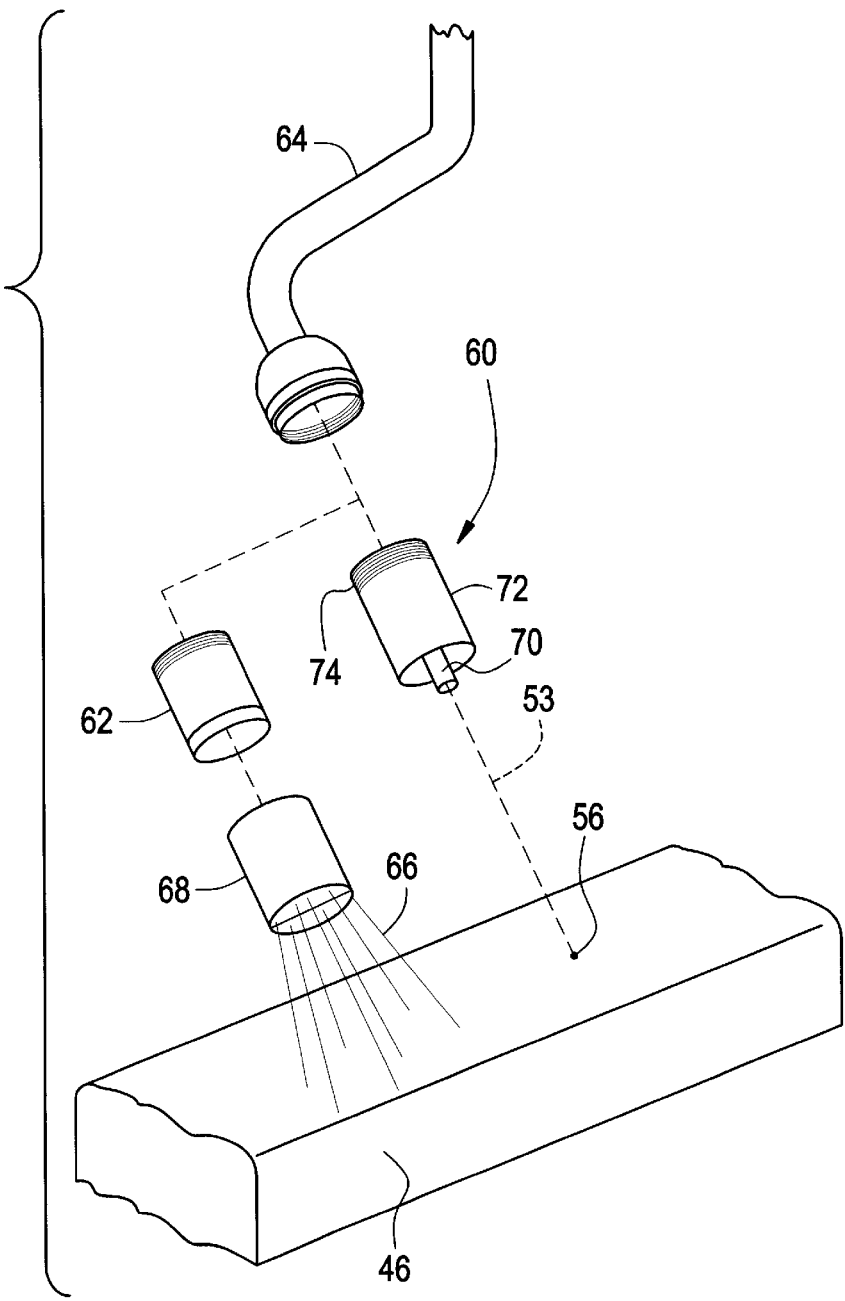
FIG 3 is an exploded view of a second embodiment of an apparatus for aligning a rail conditioning system of a rail vehicle.

A further embodiment of an apparatus 60 for aligning a rail conditioning system is illustrated in the exploded view of FIG. 3. During normal operation of the locomotive, a nozzle 62 is in threaded engagement with conduit 64 for the delivery of a diffused spray of rail conditioning material 66, such as compressed air. A rubber water diverter 68 may be placed over the nozzle 62 during normal operation to protect the nozzle opening from the collection of debris. During servicing of the locomotive, it is known to remove the nozzle 62 by unthreading it from the conduit 62 for cleaning and inspection. Nozzle 62 and water diverter 68 are illustrated in such a removed condition. Once nozzle 62 has been removed from conduit 62 for cleaning, a source of light 70 may be detachably secured to the nozzle end of conduit 62 in place of the nozzle 62. In the embodiment shown, the source of light 70 is connected to a fixture 72. The fixture 72 is provided with threads 74 which may be threaded into conduit 62. Thus, the source of light 70 is unmovingly secured with respect to conduit 64. The source of light 70 is then energized to direct a beam of light 53 toward a location of impingement 56 on rail 46 along a line of flow of a diffused spray of material 66 to be delivered by the conduit 62 through nozzle 62. Once the alignment of conduit 62 is confirmed, the apparatus 60 is removed from the conduit 62, nozzle 62 and water diverter 68 are reattached, and the spray of material 66 is delivered to the rail 46 to provide a desired coverage of the rail 46 by the rail conditioning material 66. If the alignment is not within a desired tolerance, the conduit 64 may be repositioned or bent until the proper alignment is achieved.

The conduit 64 of FIG. 3 may be used to deliver a spray of compressed air 66 for removing snow and ice from rail 46. In such an application, the conduit 62 may be positioned in front of a wheel of the rail vehicle (not shown) at an angle in a forward direction and at an angle in a sideward direction with respect to a vertical axis passing through the rail. These angles may both be about 30° in order to provide a sweeping action by the compressed air 66 in order to blow the snow and ice away from rail 46, but the exact angle is not as important as is the location of impingement 56. Accordingly, one method of using apparatus 60 includes the step of adjusting the alignment of the conduit 62 to have approximately a first predetermined angle in a forward direction and to have approximately a second predetermined angle in a sideward direction with respect to a vertical axis passing through the rail 46. In addition to this relatively coarse adjustment of the angle of attack, the more precise adjustment of the point of impingement 56 may be verified by using the apparatus 60 as described above. With such a method and device, the alignment of the conduit may be adjusted to direct impingement of the beam of laser light to within ±3/8 inch or even ±1/4 inch of a center of the rail 46.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A method of aligning a rail conditioning system installed on a rail vehicle for delivery of a rail conditioning material to a desired location on a rail relative to a wheel of the rail vehicle, the rail conditioning system including a delivery conduit having a nozzle for producing a diffused spray of a material centered along a line of flow directed toward the rail, the method comprising:

removing a nozzle from a delivery conduit of a rail conditioning system of a rail vehicle;

detachably securing a source of light on the delivery conduit in place of the nozzle to unmovingly align the source of light relative to the delivery conduit;

energizing the source of light to direct a beam of light along a path corresponding to a central line of a flow of material to be delivered by the nozzle;

detecting impingement of the beam of light on one of a rail and a wheel to assess alignment of the nozzle when installed on the delivery conduit for centering the flow of material on a desired location;

removing the source of light from the delivery conduit;

reinstalling the nozzle onto the delivery conduit; and delivering a spray of a rail conditioning material to provide a desired coverage of the rail by the rail conditioning material.

2. The method of claim 1, further comprising:

selecting the source of light to be a laser;

directing a coherent beam of light from the laser;

detecting impingement of the coherent beam of light on one of the rail and the wheel; and adjusting an alignment of the conduit to position the impingement of the coherent beam of light proximate a desired location.

3. The method of claim 2, further comprising adjusting alignment of the conduit to position the impingement of the coherent beam of light to within ±1/4 inch of the desired position.

4. The method of claim 1, further comprising performing the steps of detachably securing a source of light, energizing the source of light, detecting impingement of the beam of light, and removing the source of light during a service event when the nozzle is otherwise removed from the delivery conduit for servicing.

5. The method of claim 1, further comprising:

removing the nozzle from the delivery conduit by unthreading the nozzle;

attaching the source of light to a fixture provided with threads; and threading the fixture onto the conduit in place of the nozzle.

6. A method of aligning a rail conditioning system installed on a rail vehicle for delivery of a rail conditioning material to a desired location on a rail relative to a wheel of the rail vehicle, the rail conditioning system including a delivery conduit having a nozzle for producing a diffused spray of a material centered along a line of flow directed toward the rail, the method comprising:

detachably securing a source of light to be unmovingly aligned with a nozzle end of a conduit of a rail conditioning system:

energizing the source of light to direct a beam of light along a path corresponding to a central line of flow of a diffused spray of material to be delivered by the conduit through a nozzle;

detecting impingement of the beam of light on one of a rail and a wheel to assess alignment of the nozzle for centering the flow of material on a desired region of the rail;

delivering a spray of rail conditioning material to the rail through the nozzle to provide a desired coverage of the rail by the rail conditioning material:

removing the nozzle from the conduit prior to the step of detachably securing the source of light;

detachably securing the source of light in place of the nozzle; and reattaching the nozzle between the steps of detecting impingement and delivering a spray of rail conditioning material.

7. The method of claim 6, further comprising:

attaching the source of light to a fitting having threads; and threading the fitting into the conduit in place of the nozzle.

8. A method of aligning a rail conditioning system installed on a rail vehicle for delivery of a rail conditioning material to a desired location on a rail relative to a wheel of the rail vehicle, the rail conditioning system including a delivery conduit having a nozzle for producing a diffused spray of a material centered along a line of flow directed toward the rail, the method comprising:

detachably securing a source of light to be unmovingly aligned with a nozzle end of a conduit of a rail conditioning system;

energizing the source of light to direct a beam of light along a path corresponding to a central line of flow of a diffused spray of material to be delivered by the conduit through a nozzle;

detecting impingement of the beam of light on one of a rail and a wheel to assess alignment of the nozzle for centering the flow of material on a desired region of the rail;

delivering a spray of rail conditioning material to the rail through the nozzle to provide a desired coverage of the rail by the rail conditioning material;

attaching the source of light to a fitting having a generally hollow shape adapted for receiving the nozzle;

detachably securing the source of light by unmovingly securing the fitting over the nozzle;

forming the fitting to contain a notch in a predetermined location; and aligning the fitting on the nozzle by engaging a protruding feature of the nozzle into the notch.

9. A method of aligning a rail conditioning system installed on a rail vehicle for delivery of a rail conditioning material to a desired location on a rail, the rail conditioning system including a delivery conduit having a nozzle for producing a diffused spray of a material centered along a line of flow directed toward the rail, the method comprising:

adjusting alignment of a conduit to have approximately a first predetermined angle in a forward direction and to have approximately a second predetermined angle in a sideward direction with respect to a vertical axis passing through a rail;

removing an outlet nozzle from the conduit;

unmovingly securing a source of light on the conduit in place of the nozzle;

energizing the source of light to direct a beam of light along a path corresponding to a central line of a flow of material to be delivered by the nozzle;

adjusting alignment of the conduit to direct impingement of the beam of light onto a predetermined location;

removing the source of light from the delivery conduit; and reinstalling the nozzle onto the delivery conduit.

10. The method of claim 9, further comprising:

selecting the source of light to be a laser;

adjusting alignment of the conduit to direct impingement of the beam of laser light to within $\pm 3/8$ inch of a center of the rail.

11. A method of aligning a rail conditioning system installed on a rail vehicle for delivery of a rail conditioning material to a desired location on a rail relative to a wheel of the rail vehicle, the rail conditioning system including a delivery device for producing a flow of the rail conditioning material along a line of flow, the method comprising:

attaching a source of light to a fitting comprising a first one of a notch alignment feature and a protruding alignment feature;

detachably securing the fitting to the delivery device;

engaging the first one of the alignment features with a second one of the alignment features on the delivery device to align a beam of light produced by the source of light relative to the line of flow; and detecting impingement of the beam of light to assess alignment of the delivery device.

12. The method of claim 11 further comprising:

forming the notch alignment feature in the fitting; and detachably securing the fitting to engage the notch alignment feature with the protruding alignment feature on the delivery device.

13. A method of aligning a rail conditioning system installed on a rail vehicle for delivery of a rail conditioning material to a desired location on a rail relative to a wheel of the rail vehicle, the rail conditioning system including a delivery device for producing a flow of the rail conditioning material along a line of flow, the method comprising:

removing a nozzle of the delivery device;

detachably securing a source of light to the delivery device in place of the nozzle to align a beam of light produced by the source of light relative to the line of flow; and detecting impingement of the beam of light to assess alignment of the delivery device.

* * * * *